United States Patent
McCain et al.

(10) Patent No.: US 11,982,746 B2
(45) Date of Patent: May 14, 2024

(54) SYSTEM AND METHOD FOR TRACKING A REFERENCE LASER

(71) Applicant: Topcon Positioning Systems, Inc., Livermore, CA (US)

(72) Inventors: Steven Daniel McCain, Tracy, CA (US); Jay Kishore Nagin, Davis, CA (US); Elena Kruzhkova, Livermore, CA (US); Donna Kelley, Louisville, CO (US)

(73) Assignee: Topcon Positioning Systems, Inc., Livermore, CA (US)

( * ) Notice: Subject to any disclaimer, the term of this patent is extended or adjusted under 35 U.S.C. 154(b) by 581 days.

(21) Appl. No.: 16/721,981

(22) Filed: Dec. 20, 2019

(65) Prior Publication Data
US 2020/0256997 A1    Aug. 13, 2020

Related U.S. Application Data

(60) Provisional application No. 62/803,152, filed on Feb. 8, 2019.

(51) Int. Cl.
*G01S 17/66* (2006.01)
*E01C 19/00* (2006.01)
(Continued)

(52) U.S. Cl.
CPC ............ *G01S 17/66* (2013.01); *E01C 19/006* (2013.01); *G01C 15/004* (2013.01); *G01S 3/784* (2013.01);
(Continued)

(58) Field of Classification Search
CPC ...... G01S 17/66; G01S 7/4811; G01S 7/4972; G01S 3/784; G01S 2201/03; G01S 5/16;
(Continued)

(56) References Cited

U.S. PATENT DOCUMENTS 4,029,415 A * 6/1977 Johnson ................. G01C 15/06
33/294
4,030,832 A * 6/1977 Rando ................... G01C 15/006
33/294
(Continued)

FOREIGN PATENT DOCUMENTS

CN    101201631 A    6/2008
CN    101743452 A    6/2010
(Continued)

OTHER PUBLICATIONS

International Search Report and Written Opinion dated May 11, 2020, in connection with International Patent Application No. PCT/US2020/016319, 13 pgs.
(Continued)

*Primary Examiner* — Jennifer D Bennett
*Assistant Examiner* — Erin R Garber
(74) *Attorney, Agent, or Firm* — Chiesa Shahinian & Giantomasi PC

(57) ABSTRACT

A system and method for maintaining a laser impinging on a laser detector assembly includes determining a location of the laser from a rotating laser transmitter impinging on a laser sensor. A current position of the laser sensor along a mast of the laser detector assembly is determined and a new position for the laser sensor along the mast is determined based on the location of the laser impinging on the laser sensor and a current position of the laser sensor. The laser sensor is then moved to the new position. The system and method provide an effectively long working range of the laser detector assembly by moving the laser sensor along the mast of the laser detector assembly. An inertial measurement unit is used to calculate position information in the period between laser strikes.

20 Claims, 10 Drawing Sheets

(51) Int. Cl.
*G01C 15/00* (2006.01)
*G01S 7/481* (2006.01)
*G01S 7/497* (2006.01)
*G01S 3/784* (2006.01)
*G01S 5/16* (2006.01)

(52) U.S. Cl.
CPC .............. *G01S 5/16* (2013.01); *G01S 7/4811* (2013.01); *G01S 7/4972* (2013.01); *G01S 2201/03* (2019.08)

(58) Field of Classification Search
CPC ........ G01S 1/703; G01S 17/86; G01S 7/4817; G01S 17/931; G01S 7/4813; G01S 7/497; G01S 19/13; G01S 7/4808; G01C 15/004; G01C 15/006; G01C 21/165; G01C 5/00; E01C 19/006
See application file for complete search history.

(56) References Cited

U.S. PATENT DOCUMENTS

| | | | |
|---|---|---|---|
| 4,273,225 A * | 6/1981 | Swanson | E04H 12/18 477/7 |
| 4,602,375 A | 7/1986 | Unukai | |
| 5,756,987 A | 5/1998 | Kamataki | |
| 6,075,987 A | 6/2000 | Camp et al. | |
| 6,150,980 A | 11/2000 | Krasner | |
| 6,384,725 B1 * | 5/2002 | Dong | G01C 15/006 340/686.1 |
| 6,433,739 B1 | 8/2002 | Soliman | |
| 6,433,866 B1 | 8/2002 | Nichols | |
| 6,691,437 B1 | 2/2004 | Yost et al. | |
| 7,110,102 B2 | 9/2006 | Ohtomo et al. | |
| 7,123,186 B2 | 10/2006 | Brabec et al. | |
| 7,448,138 B1 * | 11/2008 | Vanneman | G01C 15/006 33/290 |
| 2002/0162233 A1 * | 11/2002 | El-Katcha | G01C 15/06 33/290 |
| 2003/0006048 A1 * | 1/2003 | Marriott, Jr. | E02F 3/842 701/50 |
| 2005/0001742 A1 | 1/2005 | Small | |
| 2005/0212702 A1 | 9/2005 | Brabec | |
| 2006/0008323 A1 * | 1/2006 | Torvinen | E01C 19/15 404/75 |
| 2006/0087641 A1 * | 4/2006 | Burkhart, Jr. | G01C 3/08 356/5.01 |
| 2008/0087447 A1 | 4/2008 | Piekutowski | |
| 2008/0109141 A1 | 5/2008 | Nichols et al. | |
| 2010/0157283 A1 | 6/2010 | Kirk et al. | |
| 2011/0235053 A1 | 9/2011 | Campagna | |
| 2011/0289788 A1 | 12/2011 | Steffensen | |
| 2014/0097665 A1 | 4/2014 | Paulsen et al. | |
| 2014/0283397 A1 | 9/2014 | Fessler et al. | |
| 2015/0037045 A1 | 2/2015 | Dumoulin et al. | |
| 2015/0092183 A1 | 4/2015 | Dumoulin et al. | |
| 2015/0226639 A1 * | 8/2015 | Cavanaugh | G01S 7/4811 73/114.77 |
| 2016/0223364 A1 * | 8/2016 | Peters | G01C 15/004 |
| 2017/0123066 A1 * | 5/2017 | Coddington | G01S 17/50 |
| 2018/0372498 A1 * | 12/2018 | Nackers | G01C 21/165 |
| 2019/0154444 A1 | 5/2019 | Lukic et al. | |

FOREIGN PATENT DOCUMENTS

| | | |
|---|---|---|
| CN | 102257357 A | 11/2011 |
| CN | 203546576 U | 4/2014 |
| CN | 103959944 A | 8/2014 |
| CN | 104061911 A | 9/2014 |
| CN | 104169681 A | 11/2014 |
| CN | 108398955 A | 8/2018 |
| CN | 109313026 A | 2/2019 |
| DE | 202010014183 U1 | 12/2010 |
| JP | 6471904 A | 3/1989 |
| JP | H04285214 A | 10/1992 |
| WO | 9809136 A1 | 3/1998 |

OTHER PUBLICATIONS

International Search Report and Written Opinion dated May 18, 2020, in connection with International Patent Application No. PCT/US2020/016323, 12 pgs.
Non-Final Office Action dated Aug. 2, 2022 in connection with U.S. Appl. No. 16/721,992, filed Dec. 20, 2019, 11 pages.
First Office Action dated Dec. 15, 2023, in connection with Chinese Patent Application No. 202080013175.X, 22 pgs. (including translation).
Notice of Reasons for Refusal dated Oct. 24, 2023 in connection with Japanese Patent Application No. 2021-546219, 22 pgs. (including translation).
Notice of Reasons for Refusal mailed Feb. 27, 2024 in connection with Japanese Patent Application 2021-546222, filed Aug. 6, 2021, 6 pgs. (including translation).
First Office Action mailed Mar. 6, 2024 in connection with Chinese Patent Application No. 202080013173.0, filed Aug. 6, 2021, 16 pgs. (including translation).

* cited by examiner

SYSTEM AND METHOD FOR TRACKING A REFERENCE LASER

CROSS-REFERENCE TO RELATED APPLICATIONS

This application claims the benefit of U.S. Provisional Patent Application No. 62/803,152, filed Feb. 8, 2019, the entire contents of which are incorporated herein by reference.

FIELD OF THE INVENTION

The present invention relates generally to machine control and operation, and more particularly to tracking a reference laser.

BACKGROUND

Machines used for construction can use rotating laser systems for determining elevation (e.g., height with respect to a reference) of the machine and/or implements of the machine. FIG. 1A depicts a rotating laser system that includes laser transmitter 140 outputting laser beam 128 (also referred to as "laser") that is rotated about a vertical axis of laser transmitter 140. Mirrors, optical components, and/or mechanical components of the laser transmitter cause the laser to be rotated in a laser reference plane having a known elevation 132. Laser detector 112 is attached to mast 114. Laser detector 112 detects laser beam 128 as it impinges on one of a plurality of laser detector elements (116 shown in FIGS. 1B and 1C) of laser detector 112 as is well known in the prior art. Laser detector elements can be photoreceptors, photodiodes, or other types of sensors that can detect laser beam 128. Mast 114 is attached to implement 120 of machine 110, such as a bulldozer as shown in FIG. 1A. Elevation of laser detector 112 is determined with respect to laser 128 and the elevation of implement of the machine can be determined based on the elevation of laser detector 112 since the distance from implement 120 to laser detector 112 is known.

Machine control laser receivers typically have a fixed working range that is generally from 150 mm to 250 mm. The working range of a laser detector is the vertical length within which a laser beam can be detected. In prior art systems, the working range of a laser detector is based on vertical length 118 along which laser detector elements 116 can detect laser beam 128. As shown in FIG. 1B, vertical length 118 of laser detector 112 is fixed. Equipment operators must position laser detector 112 so that laser beam 128 impinges one of the plurality of laser detector elements 116 in order to establish a grade elevation before use. Laser detector 112 is movably attached to mast 114 which allows an operator to move laser detector vertically along mast 114. Since laser beam 128 is not visible to the naked eye, the operator must search manually for rotating laser beam 128 by moving laser detector 112 vertically along mast 114 until laser detector 112 is in the path of laser 128. Some manufacturers offer motorized masts to move the laser receiver into range via remote control. While this is more convenient than manually positioning the receiver, it still requires significant time and inconvenience to locate the laser output from the transmitter.

FIG. 1C depicts laser beam 128 impinging one of the plurality of laser detector elements 116 located near the lower end of laser detector 112. This scenario occurs when laser detector 112 has moved, in this example, upward relative to laser beam 128. Similarly, when laser detector 112 has moved downward relative to laser beam 128, one of laser detector elements 116 located near the upper end of laser detector 112 will detect laser beam 128. As can be seen in FIGS. 1B and 1C, laser beam 128 can only be detected when laser 128 impinges on one of plurality of laser detector elements 116. As such, the working range of laser detector 112 is limited by its length. If laser detector 112 is moved upward or downward so that laser beam 128 does not impinge on one of laser detector elements 116, the elevation of laser detector 112 cannot be determined. For example, if laser detector 112 is moved upward (e.g., by an operator moving implement 120 upward), so that laser beam 128 no longer impinges laser detector 112, but instead, impinges mast 114 or implement 120, the elevation of laser detector 112 cannot be determined. If laser detector 112 is moved downward (e.g. by an operator moving implement 120 downward), so that laser beam 128 no longer impinges laser detector 112, but instead, impinges cab of machine 110 or travels without impinging any part of machine 110, the elevation of laser detector 112 cannot be determined.

Another typical property of most machine control laser detectors is that the output rate of the laser detector is directly related to the rate at which the laser impinges a laser detector element. A typical laser transmitter rotates a laser beam in a laser reference plane at 600 rpm (10 Hz) which translates to 100 milliseconds between each rotation, therefore the laser detector detects the laser beam at a rate of 10 Hz. As such, the laser detector outputs information pertaining to a laser strike at the same rate at which the laser is detected, which in this example, is 10 Hz. Movement of the laser detector in between successive detections of the laser impinging the laser detector is not detected.

What is needed is an easier and more efficient method and system for reference laser tracking and for providing elevation information at a faster rate and for providing an effectively long working range.

SUMMARY

A system and method for maintaining a laser beam impinging on a laser detector assembly includes determining a location at which a laser beam from a rotating laser transmitter is impinging on a laser sensor. A current position of the laser sensor along a mast of the laser detector assembly is determined and a new position for the laser sensor along the mast is determined based on the location at which the laser beam is impinging on the laser sensor and a current position of the laser sensor. A command is then transmitted to an actuator to move the laser sensor to the new position. In one embodiment, the method includes calculating the command to the actuator based on the current position of the laser sensor and the new position of the laser sensor. In one embodiment, the command is calculated based on a current velocity of the laser sensor. In one embodiment, determining the current position of the laser sensor further includes receiving data from an inertial measurement unit and determining the new position based on the data from the inertial measurement unit. In one embodiment, data from the laser sensor and the inertial measurement unit are filtered prior to determining the new position of the laser sensor.

In one embodiment, a laser detector assembly comprises a mast, a laser sensor movable along the mast and for detecting a laser, an actuator for moving the laser sensor, a laser sensor position sensor, and a controller. The controller is in communication with the laser sensor, the laser position sensor, and the actuator and is configured to actuate the actuator in order to maintain the laser within the working range of the laser detector assembly. The actuator can be actuated based on data from the laser sensor and the laser sensor position sensor. The laser detector assembly can also include an inertial measurement unit and the actuator can be actuated further based on data from the inertial measurement unit. The laser sensor can comprise a plurality of laser detector elements and the data from the laser sensor can identify one of the laser detector elements the laser is impinging.

DETAILED DESCRIPTION

Figure 2:
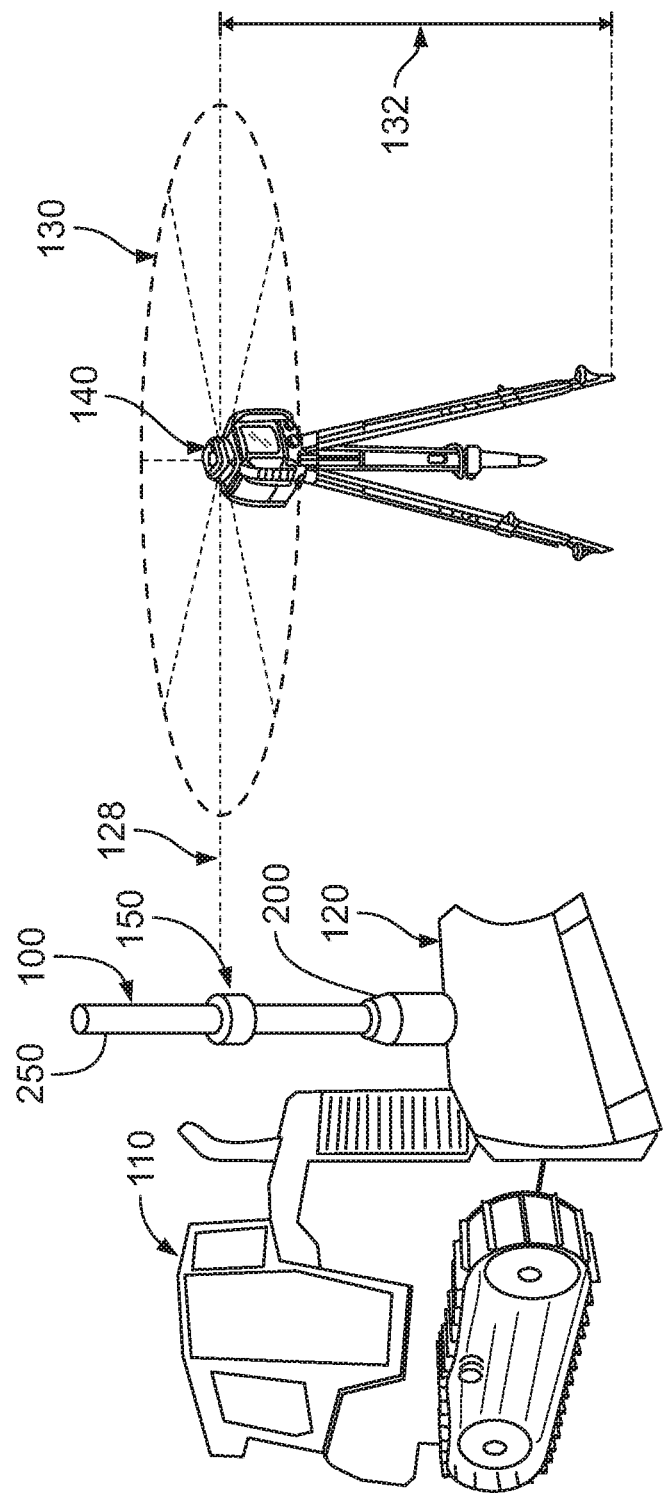
FIG. 2. depicts a system for elevation control including a laser transmitter and a laser detector assembly according to an embodiment.

FIG. 2 depicts laser transmitter 140 which outputs laser beam 128. In one embodiment, laser transmitter 140 outputs laser beam 128 which is rotated about a vertical axis thereby forming horizontal laser reference plane 130. In one embodiment, an elevation of laser transmitter 140 is known. As such, elevation 132 of laser reference plane 130 is also known. Such rotating lasers are well known in the art.

Laser beam 128 is detected by laser sensor 150 of laser detector assembly 100 which, in one embodiment, comprises laser sensor 150, mast 250, and base 200 (described in detail below). Laser detector assembly 100 is mounted to implement 120 of machine 110, which, in this example, is a blade of a bulldozer. Machine 110, in one embodiment, is used to modify a surface in accordance with a desired site plan based on data from laser detector assembly 100.

Figure 3:
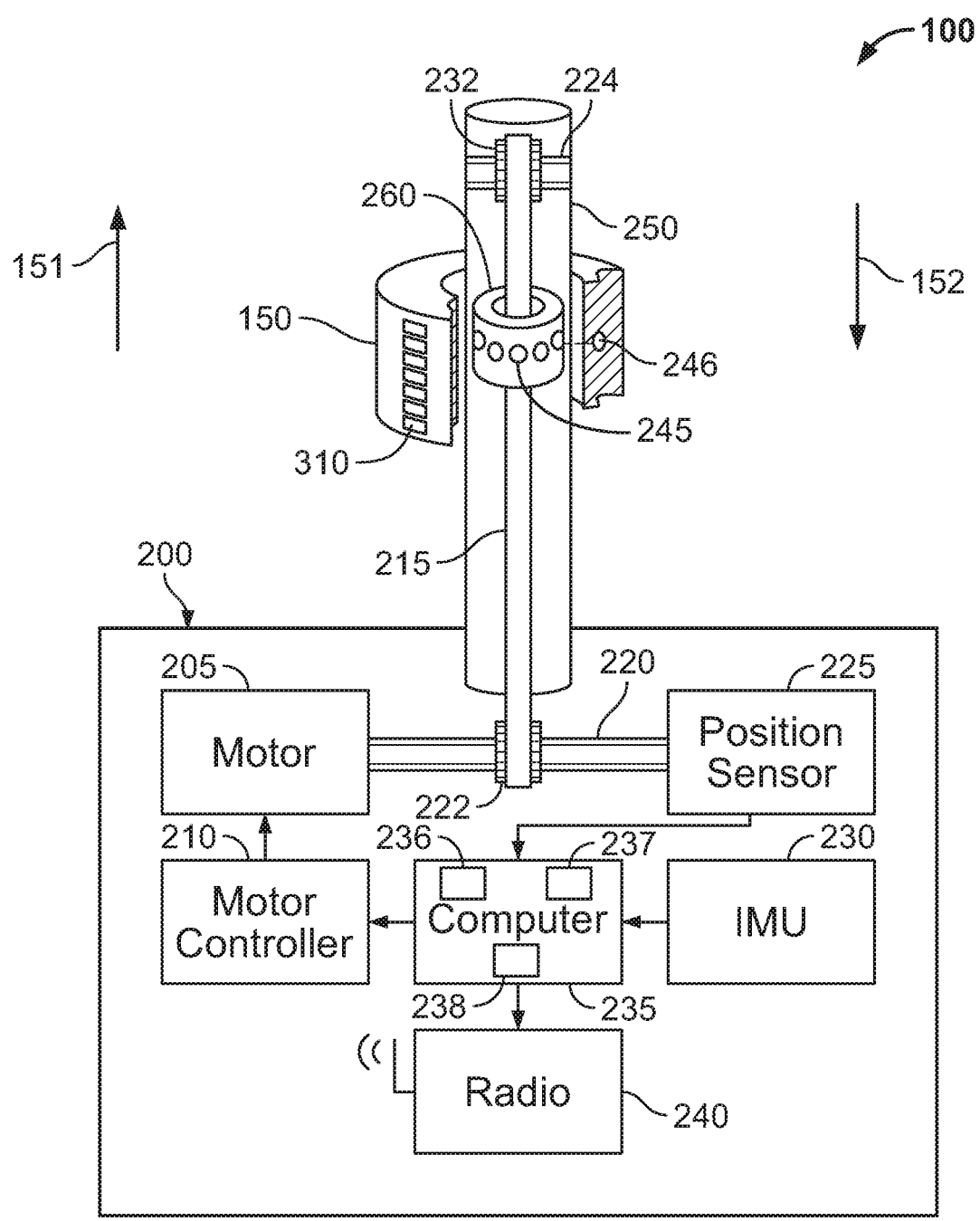
FIG. 3 depicts a laser detector assembly according to an embodiment.

FIG. 3 depicts details of laser detector assembly 100 which includes laser detector base 200. Mast 250 extends vertically from laser detector base 200 and is used as a support for laser sensor 150. Laser sensor 150 can be moved along mast 250 by motor 205 (also referred to as actuator) connected to shaft 220. In one embodiment, laser sensor 150 is approximately 100 millimeters in height and comprises plurality of laser detector elements 310 which is a line or array of photodiodes. In other embodiments, laser sensor can comprise other types of sensors and can have other heights, for example, heights ranging from 50 millimeters to 250 millimeters. In one embodiment, a laser sensor having a height of approximately 100 millimeters is moveably located on a long mast thereby providing a long detection range with a short laser sensor height which results in a lower cost than using a tall laser sensor height. Toothed pulley 222 is attached to shaft 220 and engages toothed belt 215 which is connected to carriage 260. Toothed belt 215 also engages idler pulley 232 which is located on shaft 224 near an end of mast 250. Idler pulley 232 and toothed pulley 222 are separated by a distance required to maintain a desired tension of toothed belt 215. In operation according to one embodiment, motor 205 causes shaft 220 and toothed pulley 222 to rotate which causes toothed belt 215 to move along the length of mast 250. The movement of toothed belt 215 causes carriage 260 to move in a first direction shown by arrow 151 or a second direction shown by arrow 152 along the length of mast 250 based on a direction of rotation of motor 205. The toothed pulley and toothed belt are used to maintain registration between the location of carriage 260 and position sensor 225 (described below).

Figure 1A:
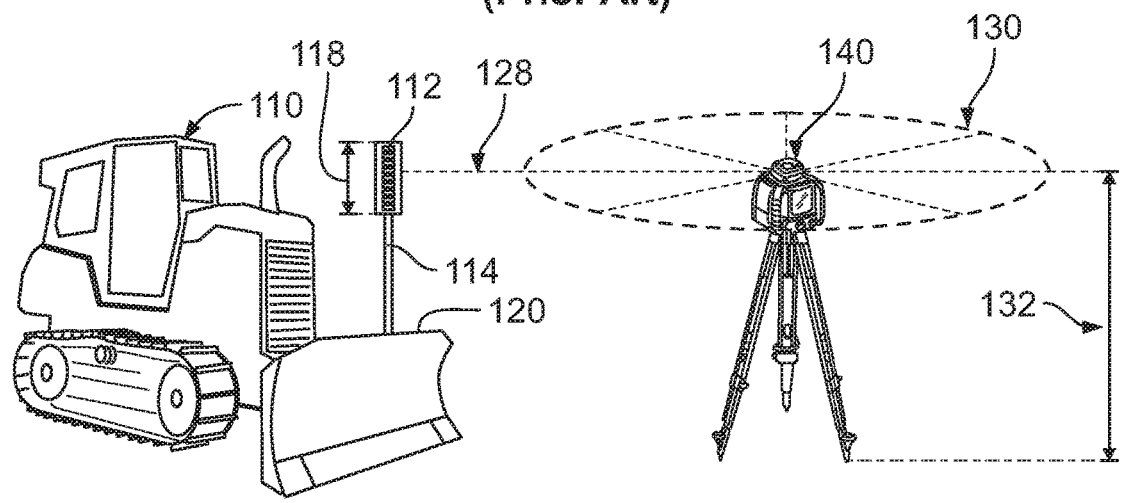
FIG. 1A depicts a rotating laser system for determining elevation.
Figure 1B:
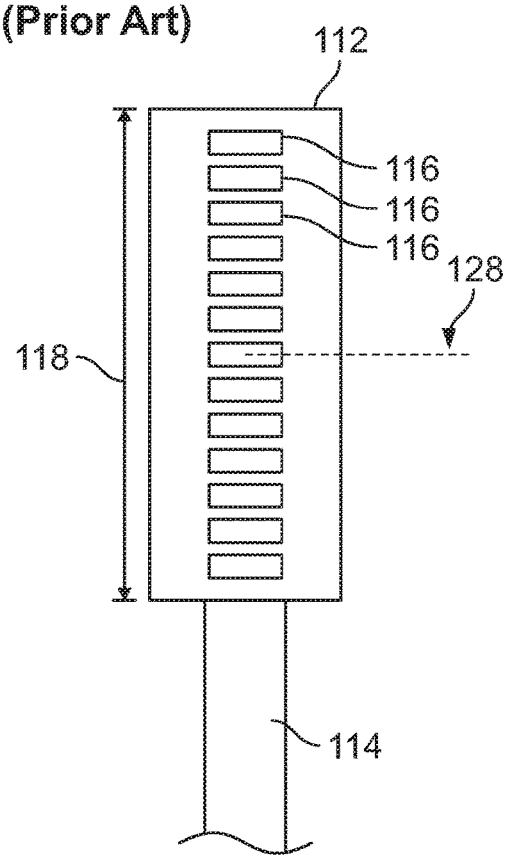
FIG. 1B depicts a laser detector with a laser beam impinging one of a plurality of laser detector elements.
Figure 1C:
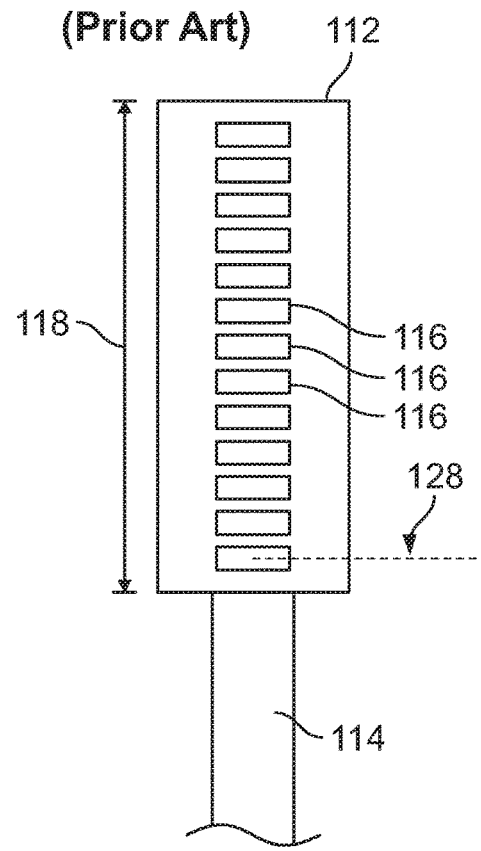
FIG. 1C. depicts the laser detector of FIG. 1B with a laser beam impinging a different one of a plurality of laser detector elements.

Carriage 260 is attached to toothed belt 215 and moves within mast 250 in response to movement of toothed belt 215. Carriage 260, in one embodiment, is cylindrically shaped and sized to fit within shaft 250. Carriage 260 has a plurality of magnets 245 about its periphery that magnetically attract magnets 246 of laser sensor 150. The attraction between magnets 245 and magnets 246 cause laser sensor 150 to maintain its position adjacent to carriage 260 as carriage 260 moves along the length of mast 250. Carriage 260, in one embodiment, is automatically moved to maintain laser detector elements 310 in view of laser beam 128. For example, as shown in FIG. 1C, laser 128 is being detected by one of the plurality of laser detector elements 116 located near an end of laser detector 112 due to upward movement of implement 120 (e.g. caused by an operator moving implement 120 or implement 120 moving upward with upward movement of machine 110) and resulting upward movement of laser detector 112. If laser detector 112 continues to move upward, laser 128 will no longer be detected by any of the plurality of laser detector elements 116. In the embodiment shown in FIG. 3, carriage 260 can be moved downward along the length of mast 250 in order to have laser beam 128 impinge at a point near the vertical center of laser sensor 150.

Shaft 220 is also attached to position sensor 225 which senses rotation of shaft 220. Since the position and rotation of shaft 220 is directly related to linear movement of toothed belt 215, and carriage 260 is attached to toothed belt 215, the position of carriage 260 along the length of mast 250 can be determined based on the position and rotation of shaft 220 as detected by position sensor 225. The toothed pulley and toothed belt maintain registration between the location of carriage 260 and position sensor 225. Other arrangements may be used instead of a toothed pulley and toothed belt arrangement in order to maintain registration between the location of carriage 260 and position sensor 225. In one embodiment, position sensor 225 is a rotary encoder but can be other types of sensors for sensing rotation. Data from position sensor 225 is transmitted to computer 235.

It should be noted that motor 205 is actuated and moves carriage 260 along the length of mast 250. However, other types of actuators may be used to move carriage 260 along the length of mast 250. For example, a hydraulic or pneumatic linear actuator may be used to move carriage 260 along the length of mast 250. Different types of actuators may require different types of sensors in order to determine position of carriage 260 along the length of mast 250. In such embodiments, the particular sensors for determining the position of carriage 260 are selected for use based on the type of actuator being used.

Computer 235 receives data from various components of laser detector assembly 100 and maintains rotating laser beam 128 impinging on laser sensor 150 and determines an elevation of implement 120 with respect to laser reference plane 130. Computer 235 contains a processor 236 which controls the overall operation of the computer 235 by executing computer program instructions which define such operation. The computer program instructions may be stored in a storage device 238, or other computer readable medium (e.g., magnetic disk, CD ROM, etc.), and loaded into memory 237 when execution of the computer program instructions is desired. Thus, the method steps of FIGS. 6A, 6B, and 8 can be defined by the computer program instructions stored in the memory 237 and/or storage device 238 and controlled by the processor 236 executing the computer program instructions. For example, the computer program instructions can be implemented as computer executable code programmed by one skilled in the art to perform algorithms defined by the method steps of FIGS. 6A, 6B, and 8. Accordingly, by executing the computer program instructions, the processor 236 executes an algorithm defined by the method steps of FIGS. 6A, 6B, and 8. Computer 235 can also include one or more network interfaces (not shown) for communicating with other devices via a network, input/output devices that enable user interaction with the computer 235 (e.g., display, keyboard, mouse, speakers, buttons, etc.) One skilled in the art will recognize that an implementation of an actual computer could contain other components as well, and that computer 235 shown in FIG. 3 is a high level representation of some of the components of such a computer for illustrative purposes.

Inertial measurement unit ("IMU") 230 is located in laser detector base 200. IMU 230 senses movement using one or more accelerometers (e.g. 3-axis accelerometer) and/or gyroscopes (e.g. 3-axis gyroscope). In one embodiment, laser detector base 200 is attached to implement 120 of machine 110. As such, IMU detects movement of implement 120 however implement 120 is moved. For example, implement can be moved by an operator of machine 110 actuating implement 120. Implement 120 can also move based on movement of machine 110 over a surface. IMU 230 can determine movement and data related to movement of IMU 230 can be transmitted to other devices.

Figure 4:
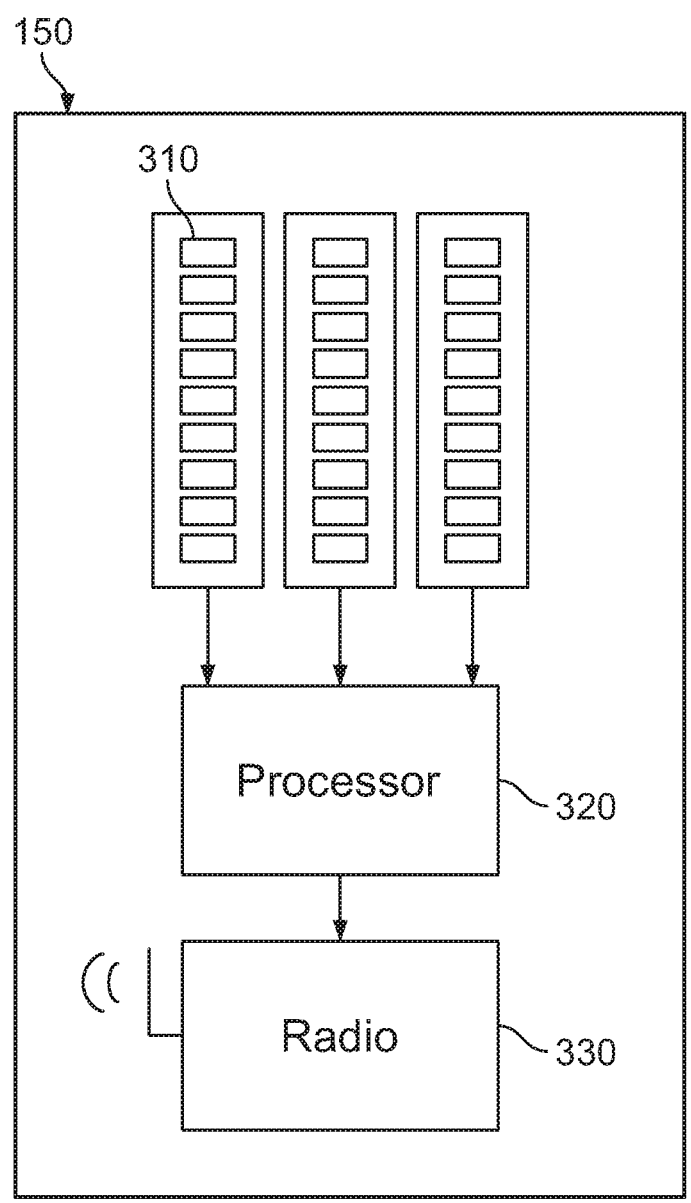
FIG. 4 depicts a laser sensor according to an embodiment.

Radio 240 is used to receive data from laser sensor 150. FIG. 4 depicts laser sensor 150 having a plurality of laser detector elements 310. Laser sensor 150 transmits data pertaining to laser detection to processor 320. In one embodiment, processor 320 analyzes data from laser sensor 150 and determines a vertical location of the laser along the vertical axis of laser sensor 150 at which laser beam 128 was impinging. For example, a detector element located at the vertical center of laser sensor 150 detecting laser beam 128 indicates that laser 128 is impinging approximately at the vertical center of laser sensor 150. Similarly, a detector element at one end of laser sensor detecting laser beam 128 indicates that laser beam 128 is impinging at a respective end of laser sensor 150. Processor 320 transmits the vertical location data to radio 330 for transmission to radio 240 located in laser detector base 200 (shown in FIG. 3). In one embodiment, radio 240 is used to receive data from radio 330 and data, such as elevation data, is transmitted from computer 235 to other devices using a wired connection as described below.

Computer 235 is in communication with radio 240. Elevation data calculated by computer 235 (as described in detail below) can be transmitted to other devices, such as a machine control indicator (not shown) associated with operation of machine 110 (shown in FIG. 2). Transmission of data from computer 235 via radio 240, in one embodiment, facilitates automation of operation of a machine, such as machine 110 shown in FIG. 2. For example, actuation of implement 120 by machine 110 can be automated to use elevation data calculated by computer 235 to modify a surface based on a desired grade. In one embodiment, elevation data calculated by computer 235 is transmitted using a wired connection to other devices. For example, a controller area network (CAN) connector located on computer 235 can be used to connect devices to computer 235 using wired connections. In addition, other types of wired connections can be used as well.

Figure 5:
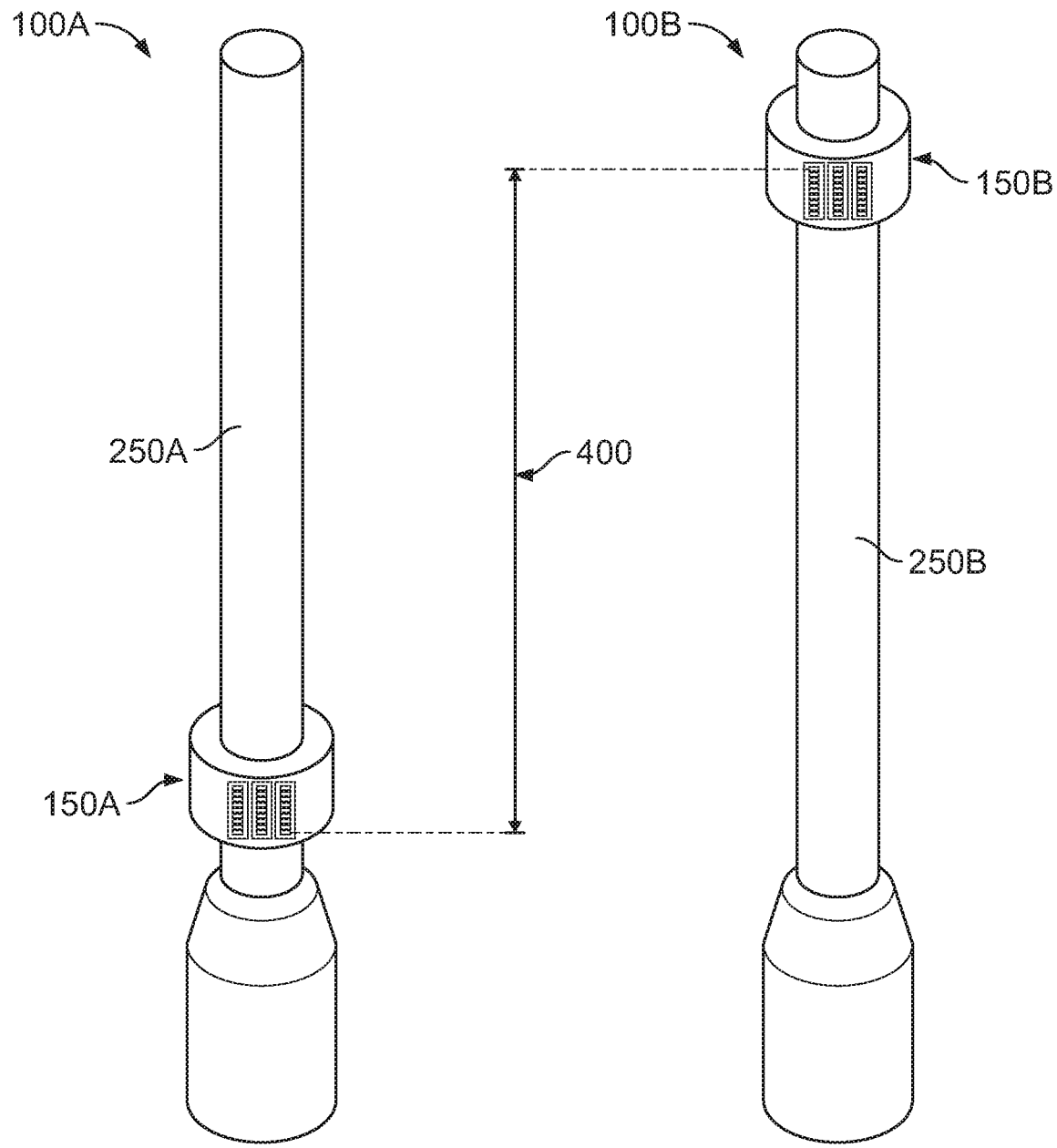
FIG. 5 depicts a mast of the laser detector assembly shown in FIG. 2 according to an embodiment.

FIG. 5 depicts laser detector assembly 100A with laser sensor 150A located at a lower end of mast 250A. Laser detector assembly 100B is depicted with laser sensor 150B located at an upper end of mast 250B. The side-by-side comparison of laser detector assembly 100A and laser detector assembly 100B illustrates working range 400 of laser detector assembly 100. Working range 400 of laser detector assembly 100 is the range in which laser beam 128 can be detected by one of laser detector elements 310 of laser sensor 150. In contrast to a fixed working range of prior art laser sensors that is limited to the vertical length of laser detector elements of a fixed laser sensor, laser sensor 150 can be moved vertically along the length of mast 150 during operation thereby allowing a greater working range in which laser beam 128 can be detected. In one embodiment, working range 400 is approximately two meters. Working range 400 can be longer or shorter based on a variety of factors that influence the selection of the vertical length of mast 250 including required grade correction, machine and implement type, etc.

FIG. 6 depicts a flow chart of a method 500 for detecting laser beam position on laser sensor 150 and moving laser sensor 150 along the length of mast 250 in order to maintain laser beam 128 impinging laser sensor 150 according to one embodiment. The method, in one embodiment, is controlled by computer 235 (shown in FIG. 3) and starts at step 504 where it is determined if laser beam 128 (shown in FIG. 3) is detected by one or more of laser detector elements 310.

If laser 128 is detected at step 504, the method proceeds to step 506 where data received from laser sensor 150 is analyzed in order to determine a position at which laser beam 128 was detected impinging on laser sensor 150 (i.e., the particular ones of detector elements 310 that the laser hit). At step 508, data is received from position sensor 225 which identifies the location of carriage 260 (and therefore laser sensor 150) along mast 250. At step 510, data (e.g. movement data) is received from IMU 230. At step 512, data received from laser sensor 150 at step 506, data received from position sensor 225 at step 508, and data received from IMU 230 at step 510 are filtered. The filtering of data is described in further detail below in connection with FIG. 9. At step 514, the vertical position where laser beam 128 impinged laser sensor 150 is calculated based on the data received from laser sensor 150. For example, each particular one of the plurality of laser detector elements 310 is located in a particular position with respect to laser sensor 150. If laser 128 is detected by a particular one of the plurality of laser detector elements 310, then it is known where laser 128 is impinging along the length of laser sensor 150 based on the known location of each of the plurality of laser detector elements 310. At step 516, a new position for carriage 260 (and therefore laser sensor 150 since the two are magnetically coupled) is calculated. The new position for carriage 260 is based on the current position of carriage 260 and which vertical direction carriage 260 needs to move, and a distance to move, in order to maintain the laser of laser reference plane 130 substantially centered on laser sensor 150.

At step 518, a motor command is calculated to command motor 205 to rotate in order to move carriage 260 based on the new carriage position calculated at step 516. At step 520, a signal to motor 205 is transmitted via motor controller 210 in order to cause motor 205 to rotate and move carriage 260 (and laser sensor 150) to the new carriage position calculated at step 516. From step 520, the method returns to step 504 and the process continues. Method 500 can be started and stopped by computer 235 as necessary in order to maintain laser beam 128 located substantially centered on laser sensor 150.

Returning to step 504, if the laser is not detected, the method proceeds to step 508 where data is received from position sensor 225 which identifies the location of carriage 260 along mast 250 and the method continues as described above.

Figure 6A:
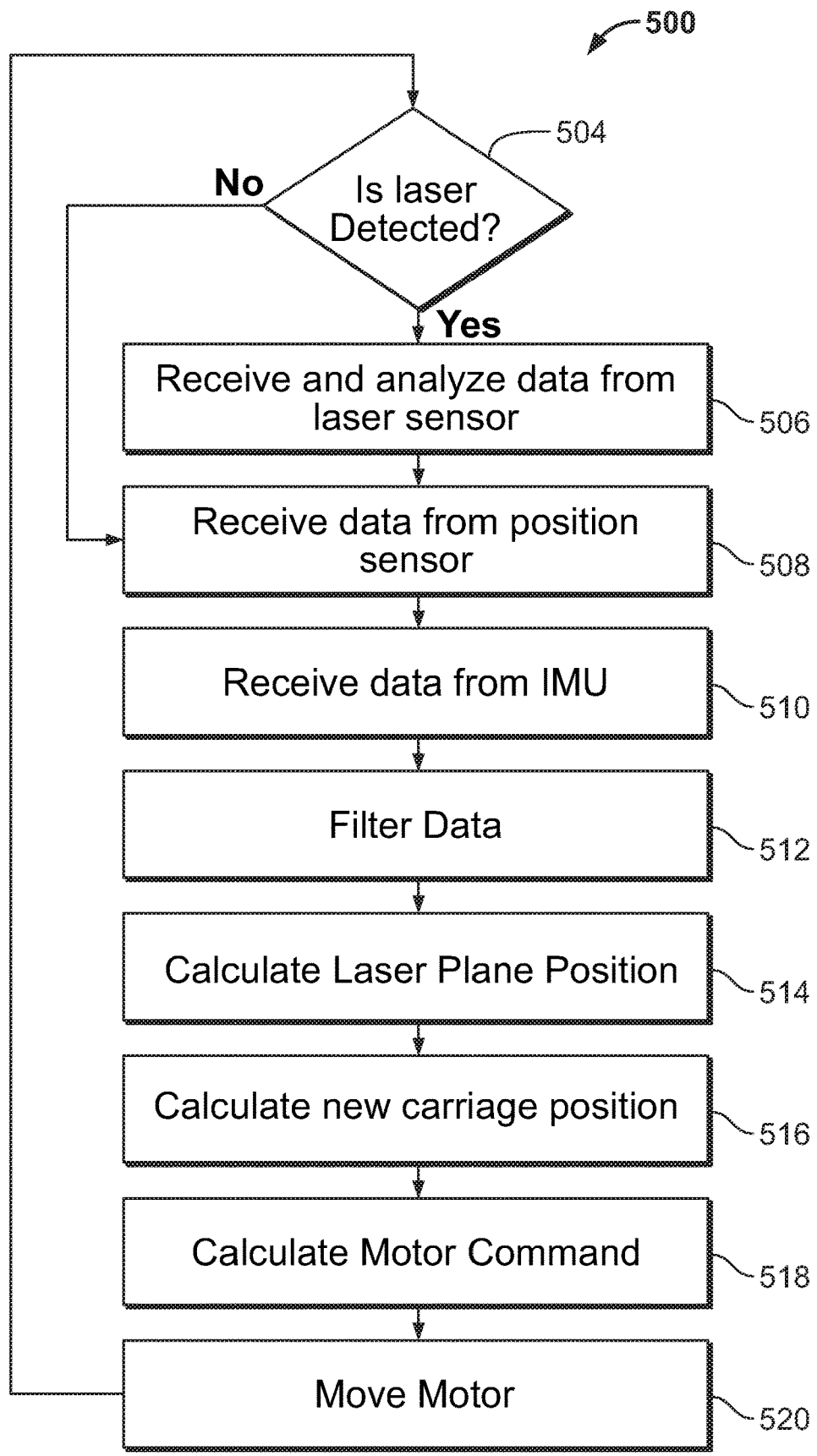
FIG. 6A depicts a flow chart of a method for detecting laser position and moving a laser detector along a mast according to an embodiment.
Figure 6B:
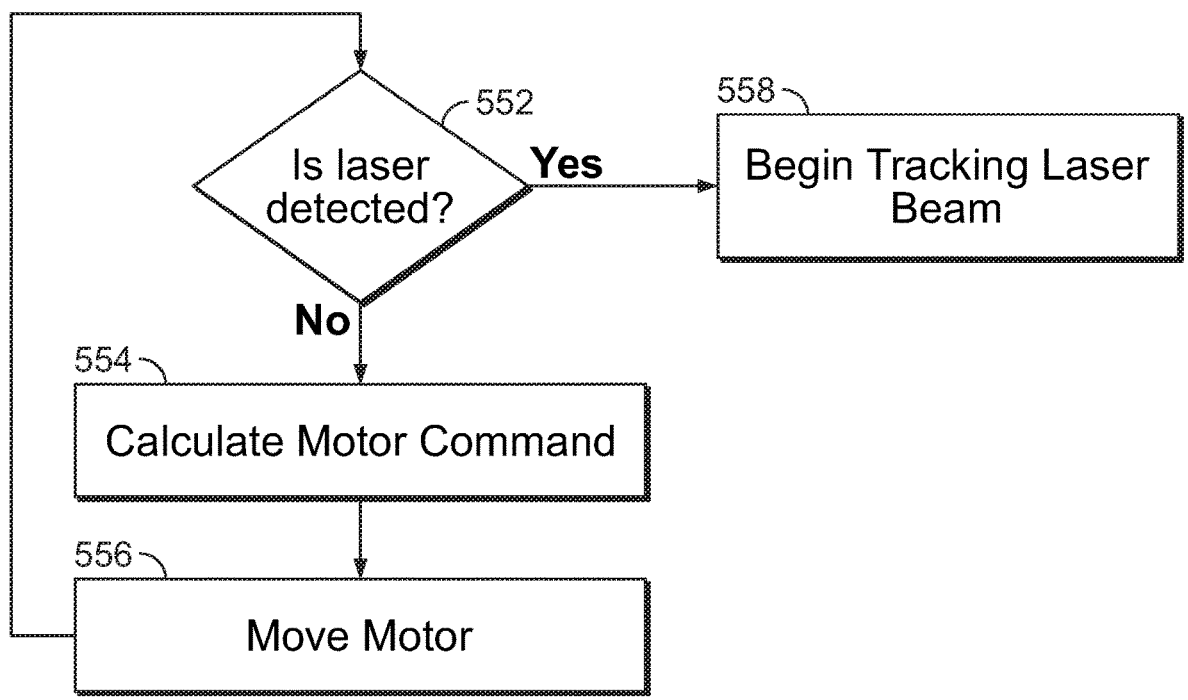
FIG. 6B depicts a flow chart of a method for seeking a laser beam output from a laser transmitter.

In one embodiment, a seek mode is used to find the elevation of the laser beam output from the laser transmitter upon startup of the laser detector assembly. FIG. 6B depicts a flow chart of method 550 for the seek mode. Upon initial startup of the laser detector assembly, the laser beam may not be impinging on the laser sensor. Seek mode moves the carriage until the laser beam is detected by the laser sensor. The method begins at step 552 where it is determined if the laser beam is detected by the laser sensor. If the laser beam is detected by the laser sensor, the method proceeds to step 558 where method 500 shown in FIG. 6A is initiated and continues to track the laser beam by moving the carriage as described above. If the laser beam is not detected at step 552, the method proceeds to step 554 where a motor command is calculated. During start up, the carriage is moved to an uppermost or lower most position of the mast and motor commands are calculated to move the carriage in increments toward an opposite end of the mast 250. At step 556, the command calculated at step 554 is used to actuate motor which causes the carriage to move. In one embodiment, when the carriage reaches the opposite end of mast, the motor commands calculated at step 554 will cause the carriage to move in the opposite direction toward its original location. In one embodiment, method 550 continues until the laser beam is detected by the laser sensor or the method is stopped by a user. In one embodiment, method 550 continues for a set period of time or a number of opposite movements along the mast before being stopped by computer 235.

In one embodiment, the seek mode depicted in method 550 is also used when the laser beam has not been detected by the laser sensor for a period of time, for example, approximately one or two seconds while computer 235 is performing method 500. Method 550 is performed until the laser beam is detected by the laser sensor at step 552 of method 550. In one embodiment, the steps of method 550 can be incorporated into the steps of method 500. If the laser beam is not detected using method 550 after a set period or time or a number of movements of the carriage along the length of the mast, an error message for notifying a user can be generated and output to a user.

In one embodiment, additional information is considered in order to determine if laser sensor 150 needs to be moved up or down. In this embodiment, it is additionally determined at step 506 if laser 128 was last detected by detector elements 310 in a pattern indicating that laser sensor 150 appeared to be moving upward or moving downward relative to laser beam 128. Computer 235 can determine a speed at which laser sensor 150 appears to be moving upward or downward relative to laser beam 128 based on the pattern. For example, laser beam 128 detected by detector elements in a sequence starting from a first detector element and sequentially detected by detector elements located vertically above the first detector element indicate that laser sensor 150 is moving downward. Similarly, laser 128 detected by detector elements in a sequence starting from a first detector element and sequentially detected by detector elements located vertically below the first detector element indicate that laser sensor 150 is moving upward. In one embodiment, at step 518, a motor command is calculated by computer 235 based on a direction and a speed laser beam 128 was determined to be moving vertically with respect to laser sensor 150. For example, if the laser was determined to be moving upward at a particular speed, computer 235 calculates an amount that motor 205 is required to rotate in order to bring the laser into view of particular ones of detector elements 310, for example, detector elements vertically located near the center of laser sensor 150. At step 510, computer 235 outputs a signal to motor controller 210 and motor controller actuates motor 205 based on the signal received from computer 235. After the motor has been moved in step 510, the method returns to step 504.

Figure 9:
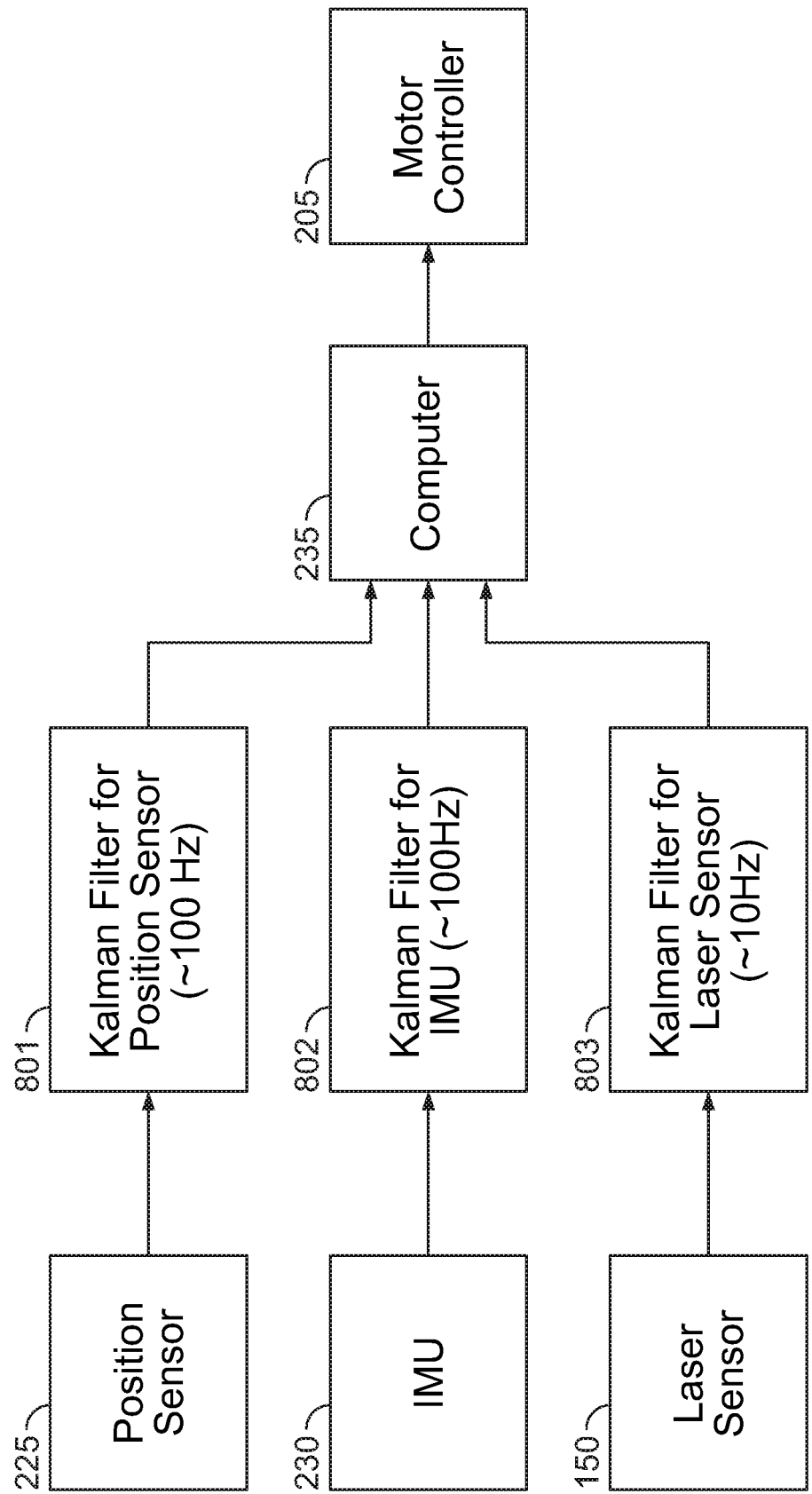
FIG. 9 depicts a schematic showing measurements fused using filters according to an embodiment.

FIG. 9 depicts an embodiment in which Kalman filters 801, 802, and 803 are used to fuse the measurements from position sensor 225, IMU 230, and laser sensor 150. As shown in FIG. 9, data from position sensor 225, IMU 230, and laser sensor 150 are filtered by Kalman filters 801, 802, and 803, respectively. Filtered data is then received by computer 235 which calculates an appropriate motor command and transmits the command to motor controller 210 as described above in connection with FIG. 6. The fusing of measurements using Kalman filters provides position and movement information pertaining to laser sensor 150. The Kalman filters described herein can be software based, hardware based, or a combination of software and hardware. In one embodiment, the purpose of the Kalman filters is to estimate the position and velocity of the laser sensor and the estimated laser strike location along the mast with respect to the laser detector base 200. The position and movement information is used to calculate the motor command to position laser sensor 150 along mast 250, for example, at steps 508 and/or 524 of method 500.

The frequency at which laser 128 impinges on laser sensor 150 is dependent on the rate of rotation of laser 128 about the vertical axis of the laser transmitter 140. A typical rotation rate of laser 128 about laser transmitter 140 is approximately 600 rotations per minute which results in laser 128 impinging on laser sensor 150 at a frequency of 10 Hz. Sensing movement of laser detector assembly 100 using data from IMU 230 allows an elevation value to be output at a higher frequency than the laser strike frequency since a change in position of the laser strike can be predicted based on data from IMU 230. As such, the frequency at which an elevation value is calculated is independent of laser strike frequency and can be any desired frequency that is supported by the frequency of the receipt of data from IMU 230 and the frequency at which computer 235 can calculate an elevation value.

In one embodiment, two Kalman filters 801 and 802 process data from position sensor 225 and IMU 230 synchronously at 100 Hz, in order to track the motion of the laser sensor 150 and the laser strike location in a decoupled manner. Kalman filter 801 processes position sensor 225 measurements also uses the motor commands sent to the motor controller 210 to obtain a better estimate of the velocity of the laser sensor 150 with respect to mast 250. Kalman filter 802 processes the IMU measurements uses IMU 230 to estimate the location of the laser strike in between actual laser strikes. This allows an estimated laser strike location to be reported at 100 Hz.

Kalman filter 803 processes laser sensor measurements as they are received typically at approximately 10 Hz as described above. Since the laser sensor measurements indicate the relative distance between the laser strike location and the detector location, Kalman filter 803 tracks the motion of both the detector and the laser strike location in a coupled manner. Kalman filter 803 prevents the mast acceleration Kalman filter 802 from diverging over time. As described above, in one embodiment, three Kalman filters are used. In other embodiments, fewer than three Kalman filters may be used.

Figure 7A:
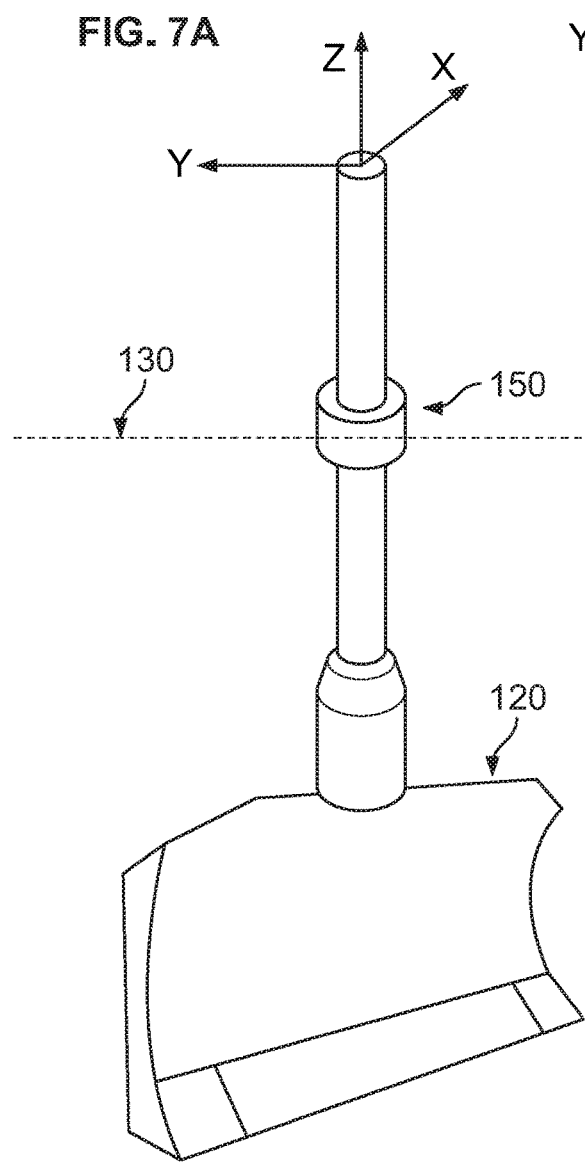
FIG. 7 depicts different orientations of a machine implement having a laser detector assembly.
Figure 7B:
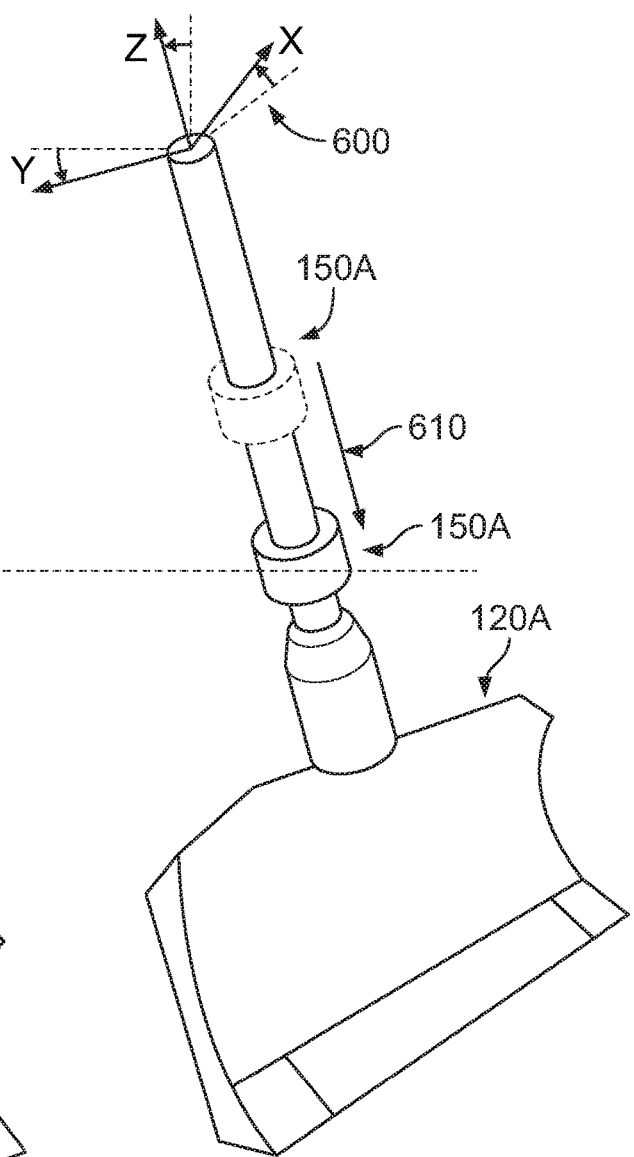

FIG. 7A depicts implement 120 having its lower most edge positioned parallel to laser reference plane 130. However, implement 120 may not always be positioned parallel to laser reference plane 130. For example, a machine associated with implement 120 may be capable of rotating implement 120 about a longitudinal axis of a machine to which implement 120 is attached. Also, the machine to which implement 120 is attached may travel over unleveled ground, such as a slope, which can cause implement 120 to not be parallel with laser reference plane 130. FIG. 7B depicts implement 120A with its lower most edge not parallel to laser reference plane 130. Implement 120A can rotate about a longitudinal axis of machine 110 either in response to an operator moving implement 120A or in response to machine 110 moving across a slope. As shown in FIGS. 7A and 7B, rotation of implement 120A in three dimensional space as shown by coordinate system 600 requires laser sensor 150A to be moved toward implement 120A, as shown by arrow 610, in order to maintain the laser of laser reference plane 130 located substantially centered on laser sensor 150A.

To account for changes in the orientation of mast 250 with respect to vertical, a complementary filter is used. The complementary filter fuses data from a 3-axis accelerometer and data from 3-axis gyroscope measurements obtained by IMU 230 and provides a unit vector indicating the direction of gravity in the coordinate system of IMU 230. The unit gravity vector is used to determine the angle of the mast with respect to vertical. This angle is used to project the 3-axis accelerometer readings from IMU 230 to yield the acceleration of the mast along the mast axis. Assuming that the rotating laser plane is fixed in the world frame of reference, this acceleration is interpreted as the acceleration of the laser strike location along the mast frame, expressed in the coordinate system of the mast frame. From experimentation, the unit gravity vector estimation is sufficient for control of the motor for up to 20 degrees with respect to vertical. In other embodiments, other types of filters may be used such as extended Kalman filters, unscented Kalman filters, or particle filters. Those filters may be used alone or in combination with other filters such as low pass filters, high pass filters, band pass filters and/or other types of filters.

Figure 8:
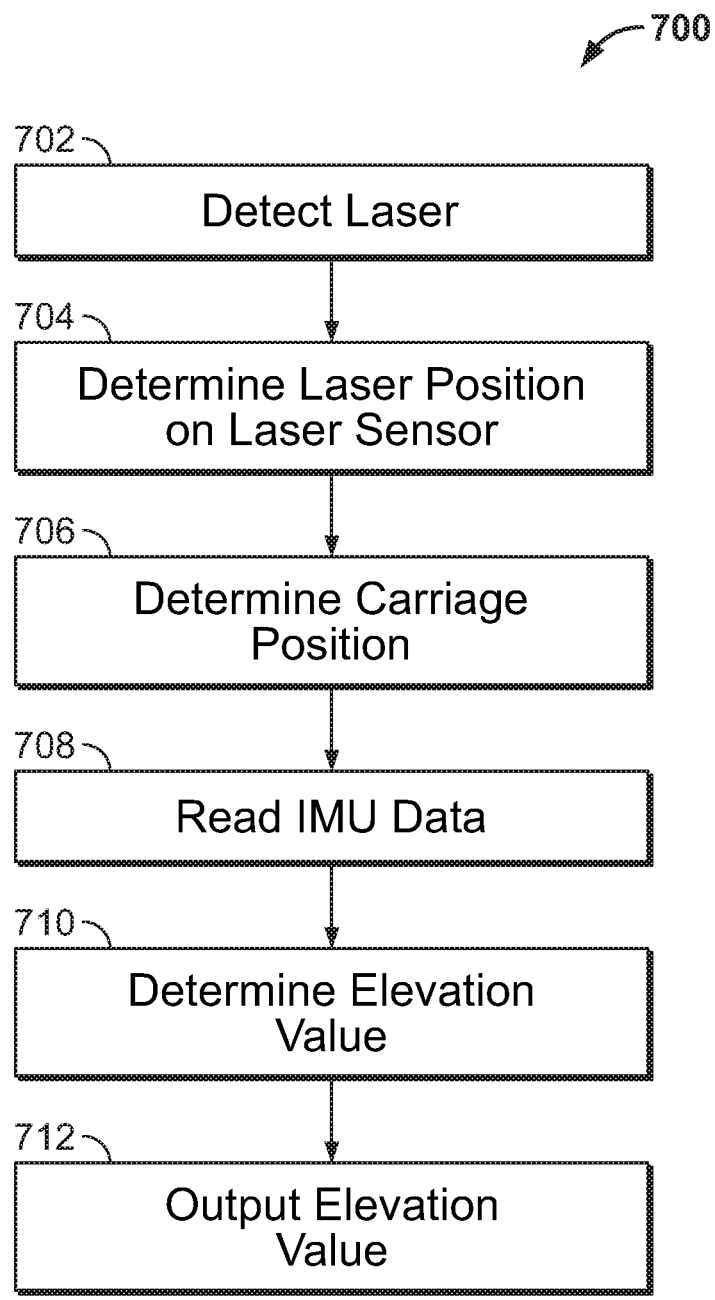
FIG. 8 depicts a flow chart of a method for detecting a laser strike and outputting elevation data according to an embodiment.

FIG. 8 depicts a flow chart of a method 700 performed by computer 235 for detecting laser beam 128 impinging laser sensor 150 and outputting elevation data. At step 702, laser beam 128 is detected by laser sensor 150. At step 704, a position of laser 128 impinging laser sensor 150 is determined. For example, laser beam 128 is detected by a certain one of laser detector elements 116 that is located in a known position along the length of laser sensor 150. At step 706, a position of carriage 260 (which is the same position as laser sensor 150 based on their magnetic coupling) is determined based on data from position sensor 225. At step 708, data from IMU 230 is read. In one embodiment, sensor data from IMU 230 is transmitted to computer 235 and can be used to determine position and movement of the estimated laser strike location from rotating laser beam 128 along the mast 250. At step 710, an elevation value is determined (described in detail below). In one embodiment, the elevation value represents the elevation of the bottom edge of implement 120. In other embodiments, the elevation value can represent other elevations such as the elevation of laser detector base 200. At step 712, the elevation value is output from computer 235 and transmitted to radio 240 which transmits the elevation value to another device, such as a control device located in a cab of machine 110.

The elevation value determined at step 710 can be calculated using various data and methods. In one embodiment, a distance from where a laser strike was detected to laser detector base 200 is calculated based on a location of the laser strike on laser sensor 150 and the distance of laser sensor 150 from laser detector base 200 at the time the laser strike was detected. This elevation value does not take into account whether laser detector assembly 100 is tilted away from vertical. Calculation of an elevation value using this method can be sufficient in some scenarios where it is unlikely that laser detector assembly 100 is expected to be tilted away from vertical.

In one embodiment, an elevation value is calculated based on additional information from IMU 230. In such an embodiment, the elevation value is calculated based on a distance from where a laser strike was detected to laser detector base 200 as well as information from IMU 230 regarding an angle laser detector assembly 100 is tilted away from vertical. As shown in FIG. 7 and described above, tilting of laser detector assembly 100 causes a difference between vertical in a world frame of reference and vertical in the mast frame of reference. This can cause errors in elevation calculation unless data from IMU 230 is used to determine deviation of laser detector assembly 100 from vertical in the world frame of reference.

In one embodiment, data from laser sensor 150, position sensor 225, and IMU 230 are used to calculate the elevation value determined at step 710. In such embodiments, data from IMU 230 pertains to tilt of laser detector assembly 100 from vertical as well as data pertaining to the position and movement of the estimated laser strike location from rotating laser beam 128 along the mast 250. Calculation of the elevation value using data from all three devices typically provides a more accurate value compared to the other methods described above. In addition, data received from the three devices can be used to calculate an elevation value at a frequency greater than the frequency of laser strikes detected by laser sensor 150 as described above.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

What is claimed is:

1. A method for positioning a laser sensor movable along a mast, the method comprising:
   determining a location at which a laser from a rotating laser transmitter is impinging on a laser sensor located outside the mast and magnetically coupled to a carriage located within the mast;
   determining a current position of the laser sensor along the mast with respect to the mast;
   determining a new position of the laser sensor along the mast with respect to the mast based on the location at which the laser is impinging on the laser sensor and the current position of the laser sensor; and
   transmitting a command to an actuator to move the carriage, and thereby the laser sensor, to the new position.

2. The method of claim 1 further comprising:
   calculating the command to the actuator based on the current position of the laser sensor and the new position of the laser sensor.

3. The method of claim 2, wherein the determining the current position of the laser sensor further comprises:
   receiving data from an inertial measurement unit, wherein the determining the new position of the laser sensor is further based on the data from the inertial measurement unit.

4. The method of claim 3, wherein the determining the current position of the laser sensor further comprises:
   receiving data from a position sensor identifying the current position of the laser sensor along the mast, wherein the data identifying the current position of the laser sensor along the mast and the data from the inertial measurement unit are filtered prior to the determining the new position of the laser sensor.

5. The method of claim 2, wherein the calculating the command is further based on a current velocity of the laser sensor.

6. The method of claim 1, wherein the actuator is configured to move the carriage, and thereby the laser sensor, vertically along the mast.

7. An apparatus for positioning a laser sensor movable along a mast, the apparatus comprising:
   a memory storing computer program instructions; and
   a processor communicatively coupled to the memory, the processor configured to execute the computer program instructions, which, when executed on the processor, cause the processor to perform operations comprising:
   determining a location at which a laser from a rotating laser transmitter is impinging on a laser sensor located outside the mast and magnetically coupled to a carriage located within the mast;
   determining a current position of the laser sensor along the mast with respect to the mast;
   determining a new position of the laser sensor along the mast with respect to the mast based on the location at which the laser is impinging on the laser sensor and the current position of the laser sensor; and
   transmitting a command to an actuator to move the carriage, and thereby the laser sensor, to the new position.

8. The apparatus of claim 7, the operations further comprising:
   calculating the command to the actuator based on the current position of the laser sensor and the new position of the laser sensor.

9. The apparatus of claim 8, wherein the determining the current position of the laser sensor further comprises:
   receiving data from an inertial measurement unit, wherein the determining the new position of the laser sensor is further based on the data from the inertial measurement unit.

10. The apparatus of claim 9, wherein the determining the current position of the laser sensor further comprises:
    receiving data from a position sensor identifying the current position of the laser sensor along the mast, wherein the data identifying the current position of the laser sensor along the mast and the data from the inertial measurement unit are filtered prior to the determining the new position of the laser sensor.

11. The apparatus of claim 8, wherein the calculating the command is further based on a current velocity of the laser sensor.

12. The apparatus of claim 7, wherein the actuator is configured to move the carriage, and thereby the laser sensor, vertically along the mast.

13. A computer readable storage device storing computer program instructions for positioning a laser sensor movable along a mast, which, when executed on a processor, cause the processor to perform operations comprising:
    determining a location at which a laser from a rotating laser transmitter is impinging on a laser sensor located outside the mast and magnetically coupled to a carriage located within the mast;
    determining a current position of the laser sensor along the mast with respect to the mast;
    determining a new position of the laser sensor along the mast with respect to the mast based on the location at which the laser is impinging on the laser sensor and the current position of the laser sensor; and
    transmitting a command to an actuator to move the carriage, and thereby the laser sensor, to the new position.

14. The computer readable storage device of claim 13, the operations further comprising:
    calculating the command to the actuator based on the current position of the laser sensor and the new position of the laser sensor.

15. The computer readable storage device of claim 14, wherein the determining the current position of the laser sensor further comprises:
    receiving data from an inertial measurement unit, wherein the determining the new position of the laser sensor is further based on the data from the inertial measurement unit.

16. The computer readable storage device of claim 15, wherein the determining the current position of the laser sensor further comprises:
    receiving data from a position sensor identifying the current position of the laser sensor along the mast, wherein the data identifying the current position of the laser sensor along the mast and the data from the inertial measurement unit are filtered prior to the determining the new position of the laser sensor.

17. A laser detector assembly comprising:
a mast;
a laser sensor located outside the mast and magnetically coupled to a carriage located within the mast and moveable along the mast with respect to the mast and configured to detect a laser output from a rotating laser transmitter;
an actuator to move the carriage, and thereby the laser sensor, along the mast;
a laser sensor position sensor; and
a controller in communication with the laser sensor, the laser sensor position sensor, and the actuator, the controller configured to actuate the actuator to move the carriage, and thereby the laser sensor, in order to maintain the laser output from the rotating laser transmitter within a working range of the laser detector assembly.

18. The laser detector assembly of claim 17, wherein the actuator is actuated based on data from the laser sensor and the laser sensor position sensor.

19. The laser detector assembly of claim 18, further comprising:
an inertial measurement unit attached to the mast and in communication with the controller,
wherein the actuator is actuated further based on data from the inertial measurement unit.

20. The laser detector assembly of claim 18, wherein the laser sensor comprises a plurality of laser detector elements, and the data from the laser sensor identifies one of the plurality of laser detector elements the laser is impinging.

* * * * *

UNITED STATES PATENT AND TRADEMARK OFFICE
CERTIFICATE OF CORRECTION

| | | |
|---|---|---|
| PATENT NO. | : 11,982,746 B2 | Page 1 of 1 |
| APPLICATION NO. | : 16/721981 | |
| DATED | : May 14, 2024 | |
| INVENTOR(S) | : McCain et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 607 days.

Signed and Sealed this
Twenty-second Day of October, 2024

*Katherine Kelly Vidal*

Katherine Kelly Vidal
*Director of the United States Patent and Trademark Office*